US012639114B2

(12) United States Patent (10) Patent No.: US 12,639,114 B2
Sousa et al. (45) Date of Patent: May 26, 2026

(54) SWARM MULTI-AGENT REINFORCEMENT LEARNING-BASED PIPELINE FOR WORKLOAD PLACEMENT

(71) Applicant: Dell Products L.P., Round Rock, TX (US)

(72) Inventors: Eduardo Vera Sousa, Niterói/RJ (BR); Hugo de Oliveira Barbalho, Rio de Janeiro (BR)

(73) Assignee: Dell Products L.P., Round Rock, TX (US)

( * ) Notice: Subject to any disclaimer, the term of this patent is extended or adjusted under 35 U.S.C. 154(b) by 780 days.

(21) Appl. No.: 17/811,693

(22) Filed: Jul. 11, 2022

(65) Prior Publication Data

US 2024/0012685 A1    Jan. 11, 2024

(51) Int. Cl.
*G06F 9/50* (2006.01)

(52) U.S. Cl.
CPC .......... *G06F 9/5011* (2013.01); *G06F 9/5088* (2013.01); *G06F 2209/501* (2013.01); *G06F 2209/506* (2013.01)

(58) Field of Classification Search
CPC ................. G06F 9/5011; G06F 9/5088; G06F 2209/501; G06F 2209/506
USPC ........................................ 718/102, 104, 105
See application file for complete search history.

(56) References Cited

U.S. PATENT DOCUMENTS

| | | | |
|---|---|---|---|
| 7,467,145 | B1 | 12/2008 | Castellanos et al. |
| 10,963,810 | B2 | 3/2021 | Dirac et al. |
| 11,574,243 | B1 * | 2/2023 | Mallya Kasaragod ...................... G06F 9/5044 |
| 2010/0242045 | A1 * | 9/2010 | Swamy ................... G06F 9/455 718/1 |
| 2018/0260746 | A1 | 9/2018 | Xiong et al. |
| 2019/0266015 | A1 * | 8/2019 | Chandra ................. G06F 9/505 |
| 2020/0090819 | A1 | 3/2020 | Durduran et al. |
| 2020/0241921 | A1 * | 7/2020 | Calmon ................. G06N 3/045 |
| 2020/0257968 | A1 * | 8/2020 | Mitra ...................... H04L 67/51 |
| 2021/0058455 | A1 | 2/2021 | Kozhaya et al. |
| 2021/0092071 | A1 | 3/2021 | Tortosa et al. |
| 2022/0180275 | A1 | 6/2022 | Parizi et al. |
| 2023/0086563 | A1 | 3/2023 | Min et al. |
| 2023/0171340 | A1 | 6/2023 | Saravanan et al. |
| 2023/0334320 | A1 | 10/2023 | Zhang et al. |
| 2024/0015080 | A1 | 1/2024 | Illikkal et al. |

(Continued)

OTHER PUBLICATIONS

Zhang, X., Shae, Z. Y., Zheng, S., & Jamjoom, H. (Apr. 2012). Virtual machine migration in an over-committed cloud. In 2012 IEEE Network Operations and Management Symposium (pp. 196-203). IEEE. (Year: 2012).*

(Continued)

*Primary Examiner* — April Y Blair
*Assistant Examiner* — Justin Che-Chun Tong
(74) *Attorney, Agent, or Firm* — Workman Nydegger

(57) ABSTRACT

Multi-agent reinforcement learning-based workload placement is disclosed. A placement engine is configured to use the state of a system and actual rewards to generate expected rewards that correspond to actions. Agents can take actions for corresponding workloads based on the expected rewards output by the placement engine. This allows workloads to be placed in a manner that conservers power relative to load placement policies while helping avoid service level agreement violations.

20 Claims, 8 Drawing Sheets

(56) References Cited

U.S. PATENT DOCUMENTS

2024/0386054 A1    11/2024  Wouhaybi et al.

OTHER PUBLICATIONS

Mignon, Alexandre dos Santos; Luis de Azevedo da Rocha, Ricardo, An adaptive implementation of e-greedy in reinforcement learning, Procedia Computer Science, 2017.

Crawford, Daniel, et al. Reinforcement Learning using Quantum Boltzmann Machines. arXiv preprint arXiv:1612.05695, 2016.

Ghojogh, Benyamin, et al. Restricted Boltzmann Machine and Deep Belief Network: Tutorial and Survey. arXiv preprint arXiv:2107. 12521 (2021).

Kullback, Solomon, and Richard A. Leibler. "On information and sufficiency." The annals of mathematical statistics 22.1 (1951): 79-86.

Gronauer, Sven; Diepold, Klaus. Multi-agent deep reinforcement learning: a survey. Artificial Intelligence Review, 2022, vol. 55, No. 2, p. 895-943.

Kalyan et al. ("Unsupervised Synaptic Pruning Strategies for Restricted Boltzmann Machines"; 2018 IEEE Biomedical Circuits and Systems Conference (BioCAS); Oct. 17-19, 2018).

Berman H.B., "Probability Rules", archived at https://web.archive. org/web/20220625141414/https://stattrek.com/probability/probability-rules, Jun. 25, 2022. Accessed Dec. 1, 2025. (Year: 2022).

Mondal et al, "Scheduling of Time-Varying Workloads Using Reinforcement Learning", 2021, The Thirty-Fifth AAAI Conference on Artificial Intelligence (AAAI-21), pp. 9000-9008. (Year: 2021).

Tong et al, "Proactive scheduling in distributed computing—A reinforcement learning approach", 2014, J. Parallel Distrib. Comput. 74, pp. 2662-2672. (Year: 2014).

* cited by examiner

SWARM MULTI-AGENT REINFORCEMENT LEARNING-BASED PIPELINE FOR WORKLOAD PLACEMENT

FIELD OF THE INVENTION

Embodiments of the present invention generally relate to placing workloads in a computing environment. More particularly, at least some embodiments of the invention relate to systems, hardware, software, computer-readable media, and methods for using infrastructure efficiently to execute workloads while respecting service level agreements (SLAs) and ensuring quality of service (QoS).

BACKGROUND

Cloud computing has several advantages, which include pay-per-use computation from the customer's perspective and resource sharing from the provider's perspective. Using virtualization, it is possible to abstract a pool of computing devices to offer computing resources to users (e.g., consumers or customers) that are tailored to the needs of the users. Using various abstractions such as containers and virtual machines, it is possible to offer computation services without the user knowing what infrastructure is executing the user's code. These services may include Platform as a Service (PaaS) and Function as a Service (FaaS) paradigms.

In these paradigms, the QoS expected by the user may be expressed through SLAs. SLAs often reflect expectations such as response time, execution time, uptime percentage, and/or other metrics. Providers try to ensure that they comply with the SLAs in order to avoid contractual fines and to preserve their reputation as an infrastructure provider.

Providers are faced with the problem of ensuring that they comply with the contractual agreements (e.g., SLAs) to which they have agreed. Providers may take different approaches to ensure they comply with their contractual agreements. In one example, a provider may dedicate a static amount of resources to each user. This presents a couple of problems. First, it is problematic to assume that an application is bounded by one particular resource. Some applications may have an IO (Input/Output) intensive phase followed by a compute-intensive phase. Dedicating some amount of static resources to each user may result in inefficiencies and idle resources. Further, it is possible that the initial allocation of resources may be under-estimated or over-estimated.

Allocating excessive resources may also adversely impact the provider. From the perspective of a single workload, the provider may perform the workload and easily comply with the relevant SLAs. However, the number of users that can be served by the provider is effectively reduced because the amount of spare resources dictates how many workloads can be performed in parallel while still respecting the SLAs. As a result, allocating excessive resources to a single workload impacts the overall efficiency and may limit the number of workloads the provider can accommodate.

While SLAs are often determined in advance of performing a workload, the execution environment is more dynamic. New workloads may compete for computing resources, and this may lead to unplanned demand, which may disrupt the original workload planning because of a greater need to share resources, workload priorities, and overhead associated with context switching.

The challenge facing providers is to provide services to their users in a manner that respects SLAs while minimizing resource usage. Stated differently, providers are faced with the challenge of efficiently using their resources to maximize the number of users.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Embodiments of the present invention generally relate to workload placement and resource allocation. More particularly, at least some embodiments of the invention relate to systems, hardware, software, computer-readable media, and methods for allocating resources using multi-agent reinforcement learning-based systems or pipelines. Example embodiments of the invention further relate to executing workloads while respecting service level agreements (SLAs) and ensuring quality of service (QoS).

SLAs are typically set or determined before a workload is executed. However, the execution of the workload is subject to various issues that may impact the ability of the provider to meet the requirements of the SLAs. Examples of such issues include inadequate knowledge about actual resource requirements, unexpected demand peaks, hardware malfunctions, or the like.

Workloads often have different bottlenecks. Some workloads may be compute-intensive while other workloads may be IO (Input/Output) intensive. Some workloads may have different resource requirements at different points of their executions. As a result, some workloads can be executed more efficiently in certain resource environments and it may be beneficial, at times, to migrate a workload to a new environment. For example, the execution environment during a compute-intensive phase of the workload may be inadequate for an IO intensive phase of the same workload.

Embodiments of the invention relate to allocating resources as required or, more specifically, to placing and/or migrating workloads in order to comply with SLAs and to efficiently use resources. In one example, allocating resources is achieved by placing workloads in specific resources, which may include migrating the workloads from one location to another workload. Workloads are placed or migrated such that SLAs are respected, to cure SLA violations, and/or such that the resources of the provider are used beneficially from the provider's perspective. One advantage of embodiments of the invention is to allow a provider to maximize use of their resources.

Embodiments of the invention are disclosed with reference to resource allocation. Embodiments of the invention may accommodate infrastructure that may or may not allow changes in the number or amount of resources (i.e., the number of cores, amount of memory, number of GPU (Graphic Processing Unit) devices, or the like). In the context of resource allocation, embodiments of the invention relate to resource allocation, which may include workload placement and/or workload migration.

Figure 1:
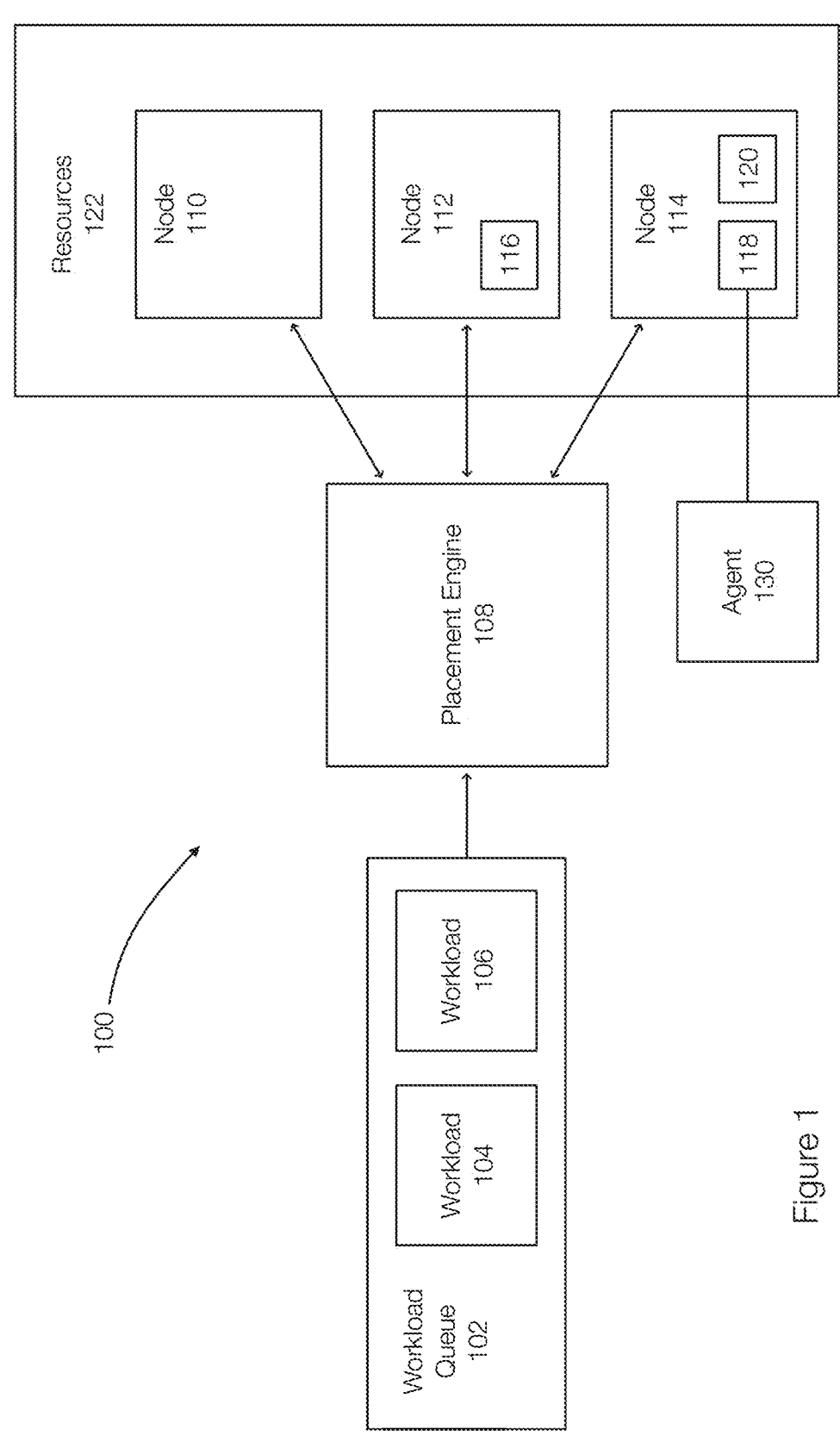
FIG. 1 discloses aspects of a system configured to place workloads in a system that includes computing resources.

FIG. 1 discloses aspects of reinforcement learning based workload placement in a computing environment. A system 100 (e.g., a datacenter or other computing environment) may include resources 122. The resources 122 may include nodes, which are represented by the nodes 110, 112, and 114. Nodes may each include a computing device or system with processors, memory, network hardware, and the like. The nodes 110, 112, and 114 may include physical machines, virtual machines, containers, and the like. Workloads are typically assigned to computers, containers, or virtual machines operating on the nodes 110, 112, and 114.

The resources 122 of the system 100 may be used to perform jobs or workloads. In other words, the system 100 allocates the resources 122 to perform the workloads. Allocating a resource may include placing a workload at a node (e.g., at a virtual machine) and/or migrating a workload from one node to another node or from one virtual machine to another virtual machine.

The following discussion assumes that workloads are performed by virtual machines and that each of the nodes 110, 112, and 114 may support one or more virtual machines. Further, each virtual machine may perform or execute one or more workloads.

Embodiments of the invention ensure that the workloads are placed with virtual machines in a manner that improves the usage of the resources 122 while complying with relevant SLAs.

The system 100 may include or have access to a workload queue 102 that stores workloads, represented by the workloads 104 and 106. When a user submits a workload, the workload may be stored in the workload queue 102 and then placed in the resources 122.

The system 100 may also include a placement engine 108, which may also operate on a node or server. The placement engine 108 may include a machine learning model, neural network, reinforcement learning model, or the like. In one embodiment, the placement engine 108 may include a reinforcement-based model configured to generate placement recommendations or actions for workloads executing in the resources 122. The placement recommendations may have different forms. For example, the placement recommendations may be in the form of a reward if a certain action is performed. The action associated with the highest reward output by the placement engine 108 is typically executed.

FIG. 1 illustrates that a workload 116 has been placed at the node 112 and that workloads 118 and 120 have been placed at the node 114. More specifically, the workload 116 may be performed by a virtual machine instantiated on the node 112 and the workloads 118 and 120 may be performed by one or more virtual machines instantiated on the node 114. These workloads 116, 118, and 120 were placed, in one example, by an agent based on recommendations of the placement engine 108.

The placement engine 108 may evaluate the state of the resources 122 as well as an actual reward associated with the execution of the workloads 116, 118, and 120 to generate new placement recommendations. This may result in the migration of one or more of the workloads 116, 118, and 120 to different virtual machines or to a different portion of the resources 122.

The placement engine 108, once trained, thus makes placement decisions or placement recommendations. Placement decisions or recommendations may include placing a new workload at a node or a virtual machine, moving or migrating a workload from a current node or virtual machine to a different node or virtual machine, and keeping a workload at the same node or virtual machine.

Each of the workloads is associated with an agent in on example. An agent, by way of example, may be a component or engine that operates in a computing environment to perform actions, communication, or the like. An agent may thus generate goals, perform actions, sense the environment, determine status of a computing system, learn, or the like. FIG. 1 illustrates an agent 130 associated with a workload 118. In one embodiment, each of the workloads 116, 118, 120 executing in the resources 122 is associated with a different agent. At the same time, all of the agents in the system 100 use the same placement engine 108. This allows swarm behavior for the agents where each of the agents is associated with a different workload while using the same placement engine 108.

Figure 2:
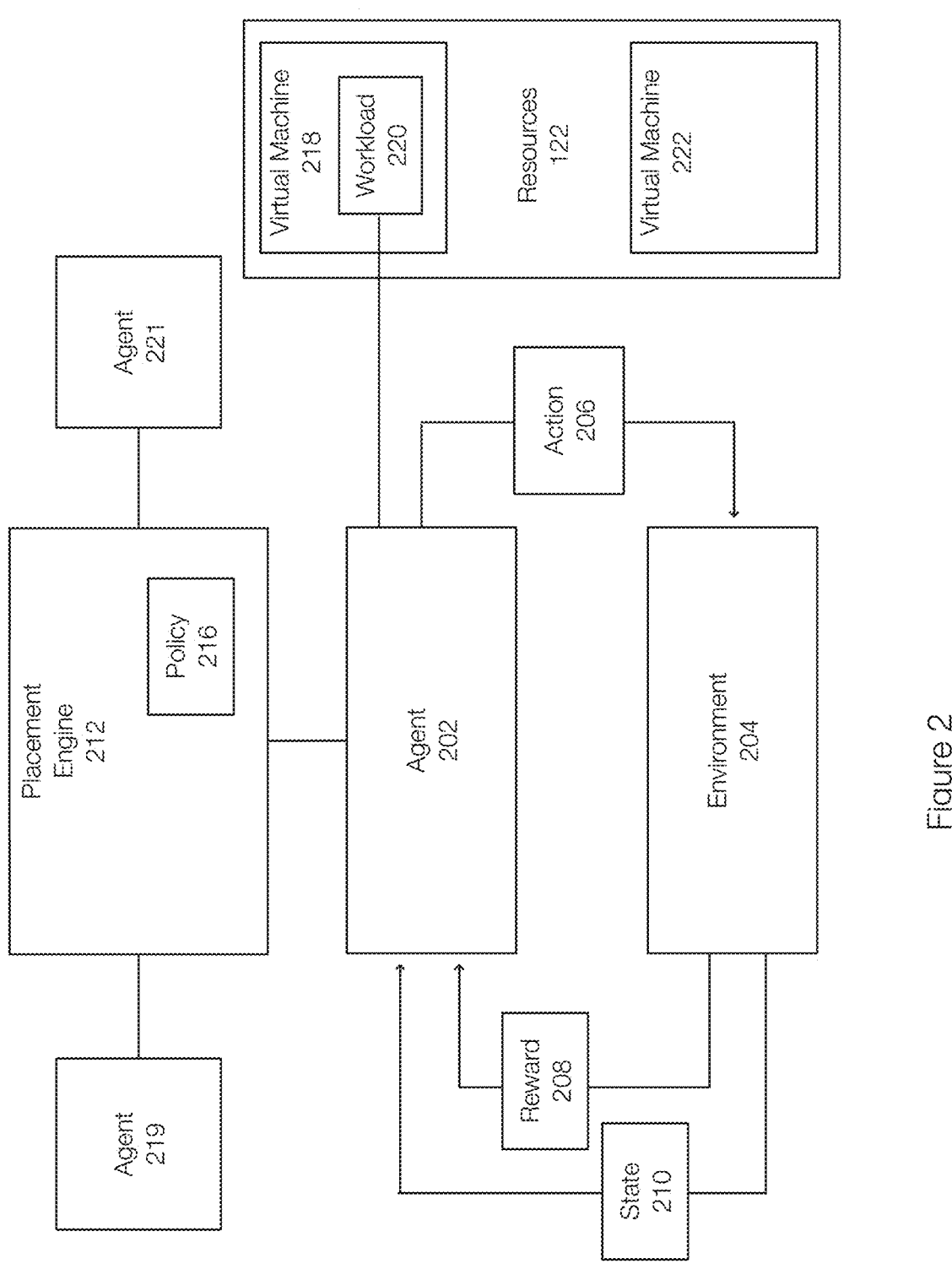
FIG. 2 discloses aspects of multi-agent reinforcement learning for workload placement in an environment.

FIG. 2 discloses aspects of placing workloads using a reinforcement learning model. In FIG. 2, an agent 202 may be associated with a workload 220 being executed by a virtual machine 218, which may be part of the resources 122. The agent 202 may perform an action 206 (e.g., a placement action) with regard to the workload 220. The action 206 may include leaving the workload 220 at the virtual machine 218 or moving/migrating the workload 220 to the virtual machine 222.

The action 206 is thus executed in the environment 204, which includes the resources 122 or more specifically the virtual machines 218 and 222. After execution or during execution of the workload 220, the state 210 and/or a reward 208 may be determined and returned to the agent 202 and/or to the placement engine 212.

In one example embodiment, the reward 208 may be a value that represents the execution of the workload 220 relative to an SLA or an SLA metric. For example, the reward may represent a relationship between the response time (rt) of the workload and the response time specified in the SLA.

An example reward function may be defined as follows:

$$f(\Delta, \sigma_L, \sigma_R) = \frac{-(\Delta)^2}{e^{2\sigma_L^2}} \text{ if } \Delta > 1, \text{ otherwise } \frac{-(\Delta)^2}{e^{2\sigma_L^2} - 1}.$$

In one example embodiment, $\Delta$ is a difference between the SLA and the response time. In one example, $\sigma_L, \sigma_R$ define, respectively, how fast the left and right portion of the curve decays.

Figure 3:
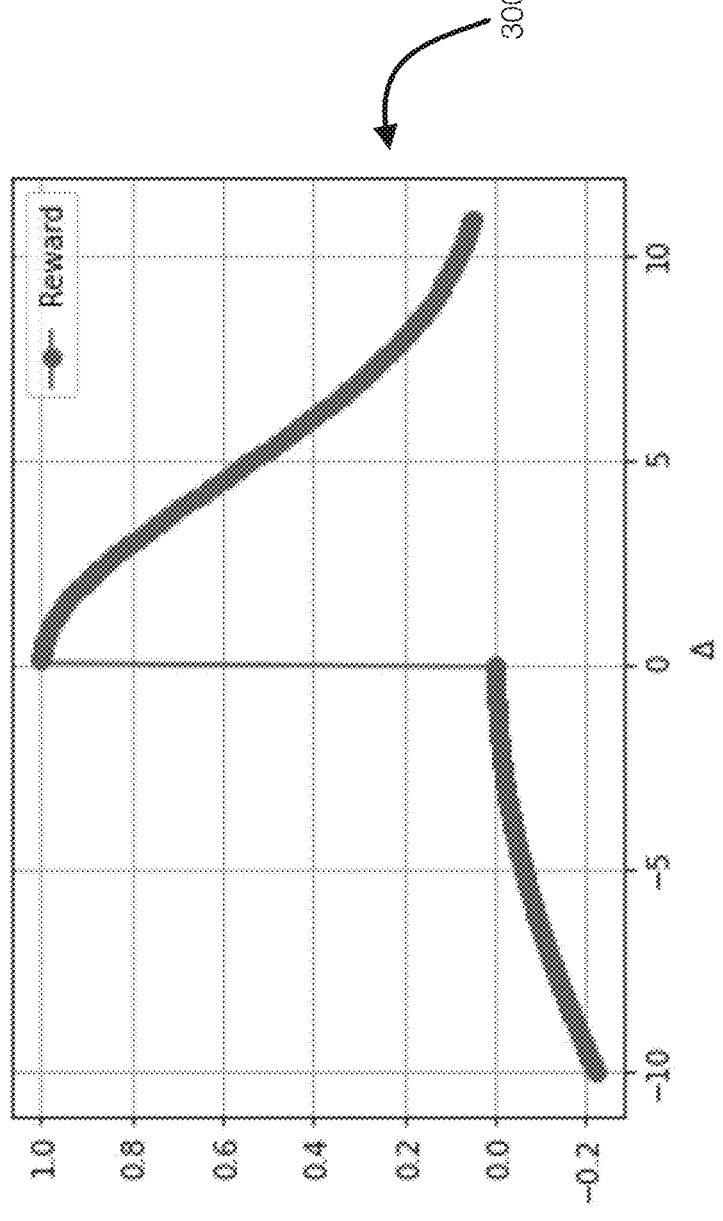
FIG. 3 discloses aspects of a reward function.

FIG. 3 discloses aspects of a reward curve. More specifically, the curve 300 is an example of a reward curve where $\sigma_L=2$ and $\sigma_R=0.75$. In this example, there are several possibilities for the value of $\Delta$:

1) $\Delta>0\rightarrow$SLA>rt: In this case, there is a positive gap between the SLA and the value of the response time (rt). This indicates that resources are being wasted and should provide a positive reward.

2) $\Delta<0\rightarrow$SLA$<$rt: In this case, there is a negative gap between the SLA and the response time. This indicates an SLA violation and should provide a negative reward.

3) $\Delta=0\rightarrow$SLA$=$rt: In this case, there is no gap between the SLA and the response time. This indicates that the workload fits perfectly with the infrastructure and a maximum reward should be provided.

In one example embodiment, the state 210 may include or represent one or more of resource usage per virtual machine, resource usage per workload, state of each workload, time to completion for each workload or the like or combinations thereof. The state 210 may be formed as a type or style of one hot encoding that allows the state of all resources (e.g., all virtual machines/nodes in the resources 122) to be included in the one hot encoding style. In one example, the one-hot encoding is a one hot encoding style that includes floating point values to represent the state 210. The state 210 may also represent resources (e.g., idle virtual machines) that are not being used. The state 210 allows all agents to have insight and understanding into the infrastructure and state of all resources. In other words, each of the agents can see the environment of the workload as well as the other workload environments in the system. As previously stated, however, all of the agents share or use the same placement engine 212 in one example.

Returning to FIG. 2, the state 210 of the environment 204 and the reward 208 are input into the placement engine 212 (directly or by the agent 202 as illustrated in FIG. 2). The state 210 may include the state of each node or virtual machine included in the resources 122. This information can be represented in a one hot encoding style. In this example, the reward 208 reflects the actual performance (rt) at the virtual machine of the workload 220. If using response time (rt) as a metric, the reward reflects the relationship between the actual response time and the SLA response time.

The placement engine 212 may generate a new recommended action for the agent 202 to perform for the workload 220. This allows the agent 202 to continually adapt to changes (e.g., SLA compliance/non-compliance) at the resources 122 and perform placement actions that are best for the workload 220 and/or for the provider to comply with SLA requirements, efficiently use the resources 122, or the like.

The placement engine 212 may also have a policy 216 that may impact the placement recommendations. The policy, for example, may be to place workloads using a minimum number of virtual machines, to perform load balancing across all virtual machines, or to place workloads using reinforced learning. These policies can be modified or combined. For example, the policy may be to place workloads using reinforced learning with some emphasis towards using a minimum number of virtual machines or with emphasis toward load balancing. Other policies may be implemented.

The output of the placement engine 212, may depend on how many actions are available or defined. If a first action is to keep the workload where the workload is currently operating and the second action is to move the workload to a different node, the output of the placement engine may include two anticipated rewards. One of the rewards corresponds to performing the first action and the other reward corresponds to performing the second action. The action selected by the agent 202 will likely be the action that is expected to give the highest reward. As illustrated in FIG. 2, multiple agents 219, 221, and 202 are using the same placement engine 212. In one example, because the resources 122 may include multiple virtual machines, an expected reward may be generated for migrating the workload to one of those virtual machines.

The placement engine 212, prior to use, may be trained. When training the placement engine 212, workloads may be moved randomly within the resources. At each node, a reward is generated. These rewards, along with the state, can be used to train the placement engine 212. Over time, the placement becomes less random and begins to rely on the output of the placement engine 212 until training is complete.

The placement engine 212, prior to use, may be trained. When training the placement engine 212, workloads may be moved randomly within the resources. At each node, a reward as generated. These rewards, along with the state, can be used to train the placement engine 212. Over time, the placement becomes less random and begins to rely on the output of the placement engine 212 until training is complete.

Thus, the placement engine 212, by receiving the reward 208 and state 210 during training, which may include multiple migrations some of which may be random, can implement reinforcement learning. Conventionally, reinforcement learning may rely on a Q-table. Embodiments of the invention, however, may provide deep learning reinforcement learning. More specifically, the placement engine 212 may include a neural network that allows the experiences of the agents, along with random migrations, to train the placement engine 212. One advantage of the placement engine 212 is that the placement actions or recommendations can be mapped to a much larger number of states compared to a conventional Q-table, which is essentially a lookup table, and that the mapping can be learned.

Figure 4:
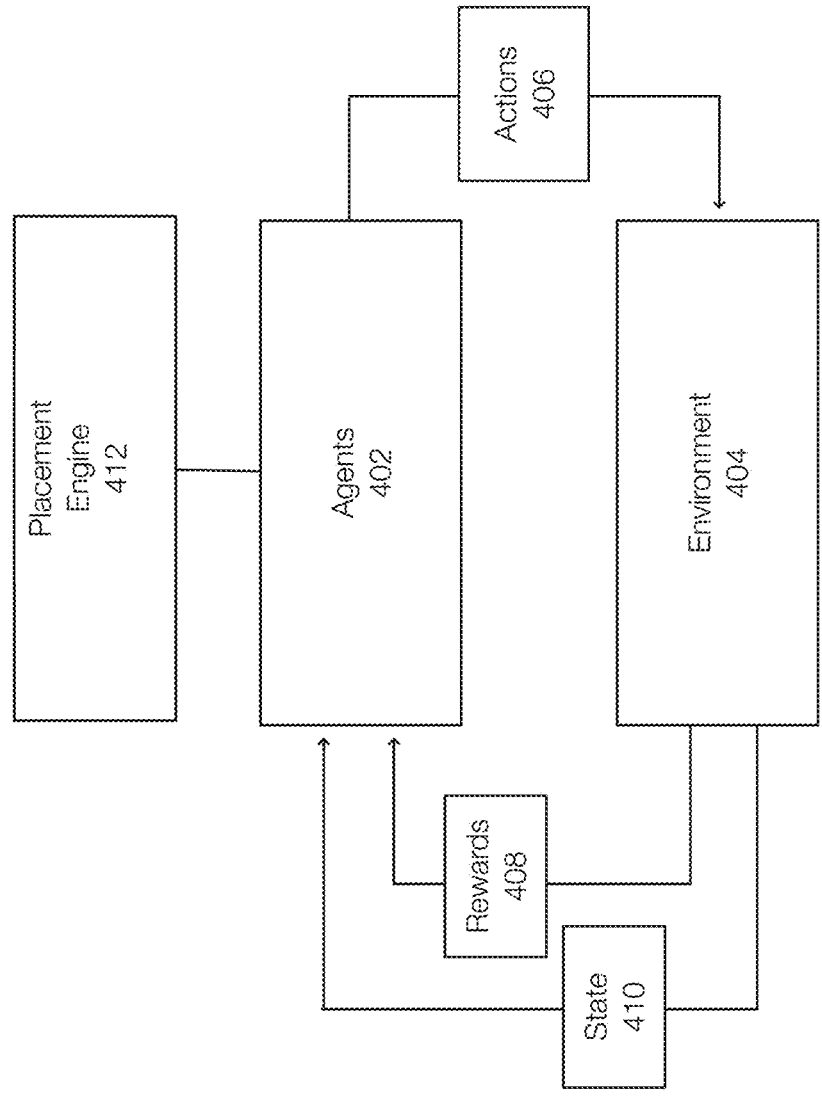
FIG. 4 discloses additional aspects of multi-agent reinforcement learning with a single placement engine.

FIG. 4 discloses aspects of a system configured to dynamically place workloads in the context of multiple agents. FIG. 4 illustrates agents 402 that perform actions 406 relative to corresponding workloads placed in the environment 404 (e.g., the resources 122). In this example, each device (e.g., each virtual machine) has a state. In this example, the state 410 includes the state of each virtual machine in the environment 404. The rewards 408 correspond to the rewards determined at each of the devices or virtual machines. The placement engine 412, when making recommendations, may consider all rewards collectively or may consider the rewards associated with a specific agent when generating a placement recommendation.

As agents operate to place workloads, the rewards 408 can be shared or not shared. When the rewards 408 are shared, the agents 402 are collaborative. When the rewards 408 are not shared, the agents 402 are competitive. In both cases, the agents rely on the same placement engine 412. The inputs to the placement engine 412 include the state 410 and the rewards 408. The actions are defined by migrations between devices or virtual machines in the environment 404. For example, competitive agents may operate to run the workloads as fast as they can while collaborative agents may work to conserving resources.

Figure 5:
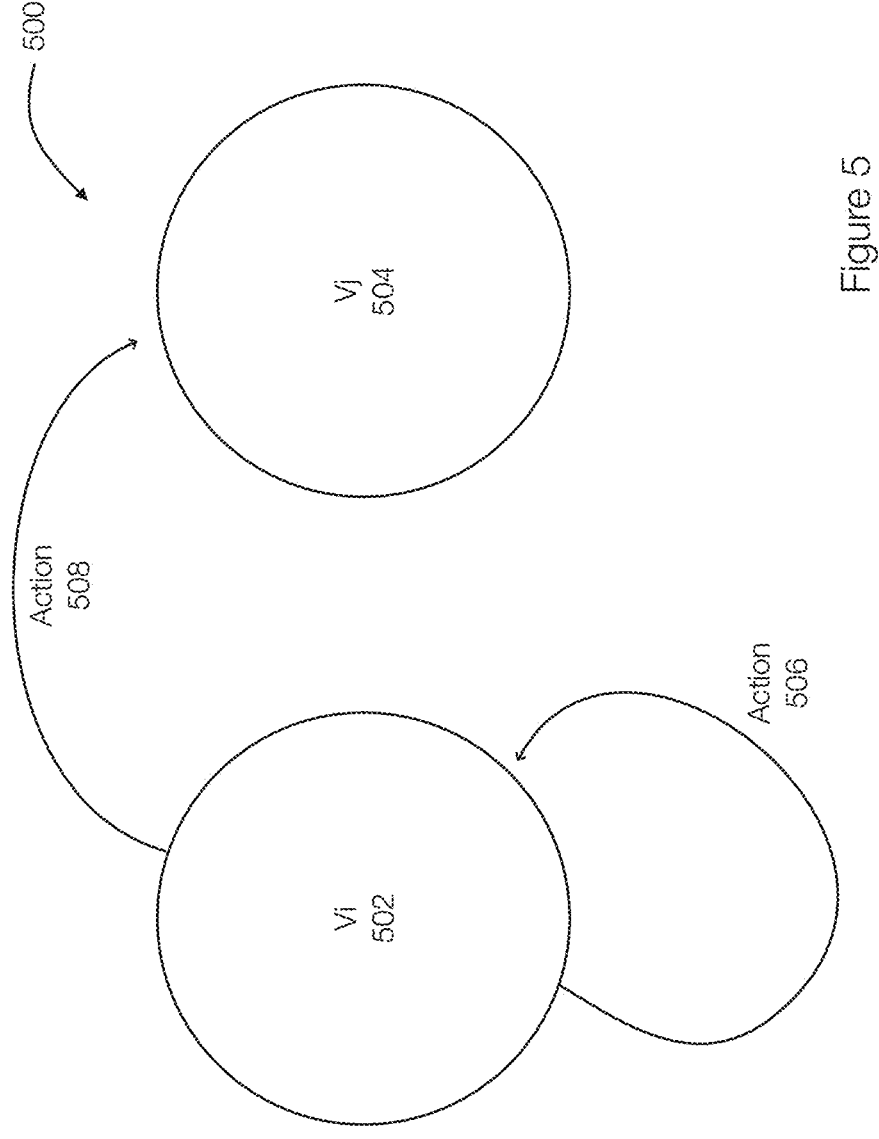
FIG. 5 discloses aspects of an action space.

FIG. 5 discloses aspects of an action space 500. In one example, the action space 500 is defined by integer values that represent the index of the virtual machines where the workloads can be placed. The virtual machines may have the same or different resources. For example, if a workload is placed at virtual machine $V_i$ 502 in an environment with n virtual machines, the actions are to move or migrate (action 508) the workload to the virtual machine $V_j$ 504, where $j\neq i$ and $0<j\leq n$, or to move the workload to the virtual machine $V_i$ (action 506). The action 506 is in effect, to keep the workload at the same virtual machine. Initially, all of the workloads are in a non-initialized state.

Figure 6:
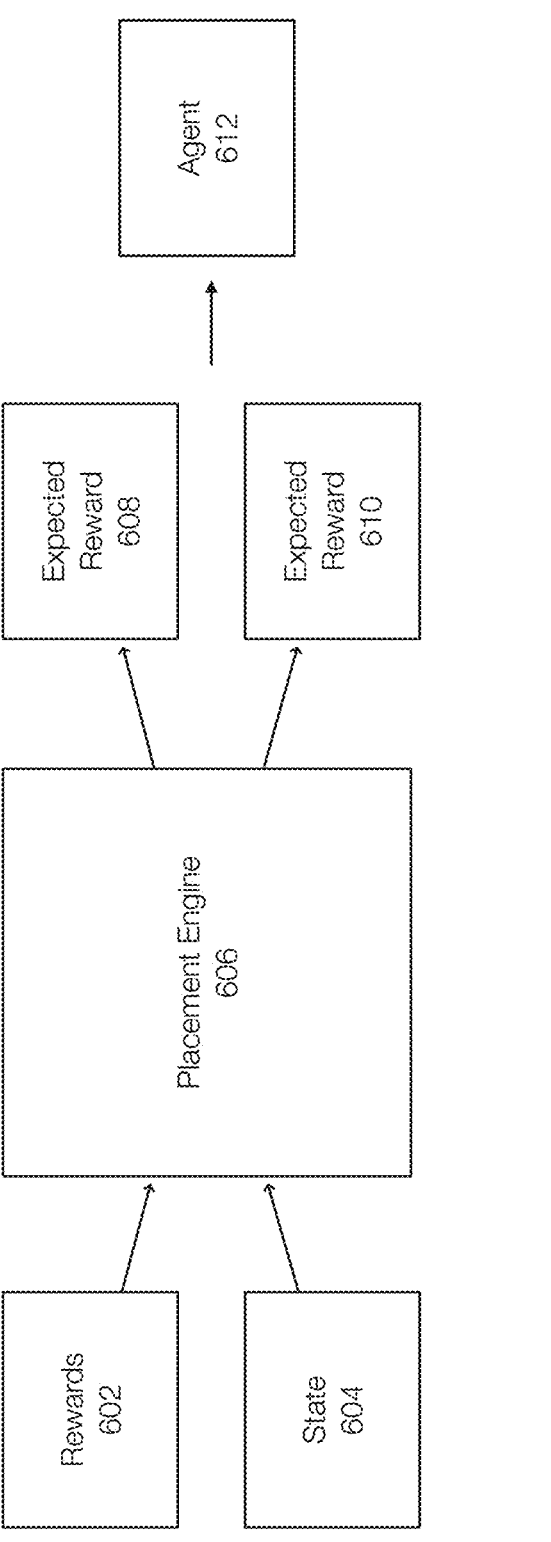
FIG. 6 discloses aspects of placing workloads.

FIG. 6 illustrates aspects of placing a workload. In FIG. 6, a placement engine 606 may receive inputs including rewards 602 and a state 604. The rewards 602, for a particular agent, may include the actual rewards relative to the current execution of the workload of the agent at a specific virtual machine in the resources. The state 604, however, may include the states of all virtual machines in the environment. In another example, the rewards 602 may include rewards associated with all of the agents.

The placement engine 606 may output an expected reward 608 and an expected reward 610. The expected reward 608 may be the reward expected for performing a specific action, such as keeping the workload at the same node or virtual machine (e.g., action 506). The expected reward 610 may be the reward expected for performing a different action, such as migrating the workload to a different node or virtual machine (e.g., action 508).

As the number of migration destinations increases, the output of the placement engine 606 may include a reward for each virtual machine in the environment. This allows the agent 612 to select a specific reward and perform the associated action: keep workload at current virtual machine or migrate the workload to a new virtual machine.

Figure 7:
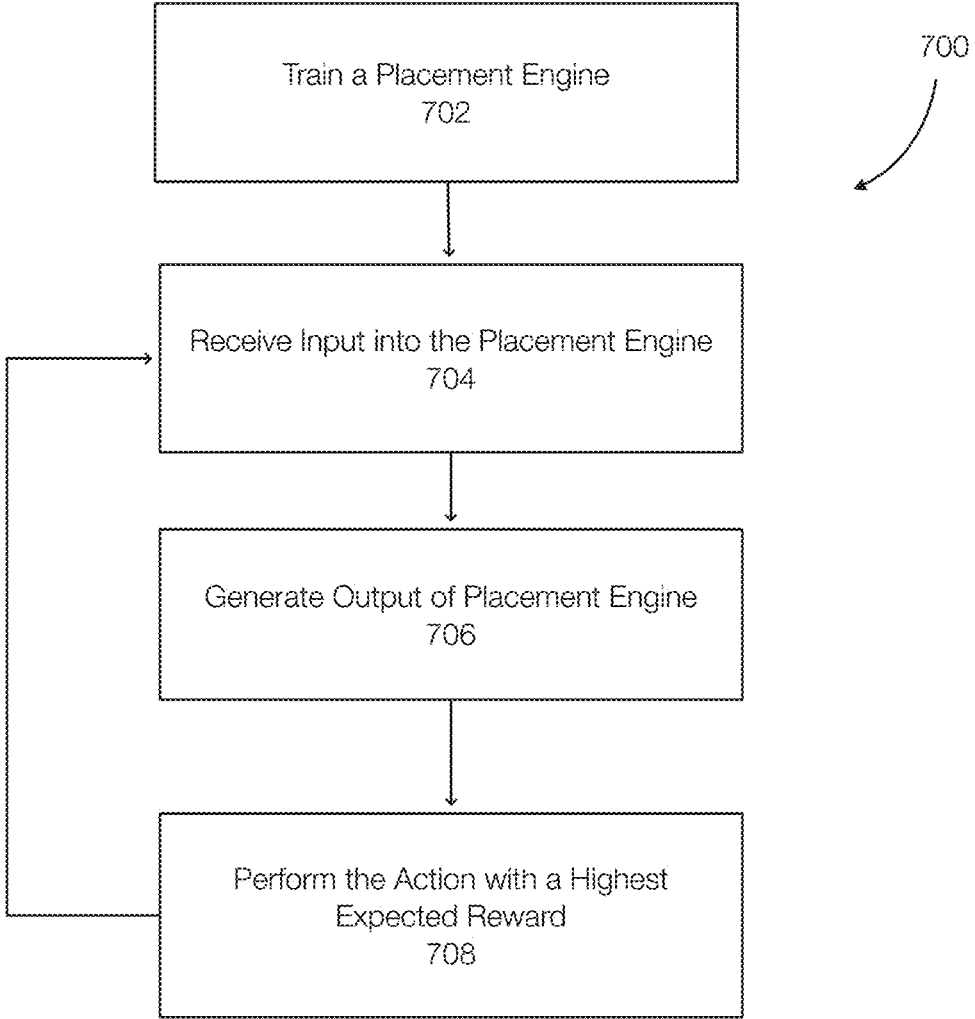
FIG. 7 discloses aspects of placing workloads that have been trained using rewards.

FIG. 7 discloses aspects of placing workloads in an environment. The method 700 includes elements that may be performed once or less frequently than other elements. For example, the placement engine may be trained once, periodically, or continually.

The method 700 may begin by training 702 a placement engine. Next, the placement engine operates and may receive input 704 from or associated with one or more agents. The input may include a state of the environment and/or an actual reward of the workload at the current virtual machine. The placement engine then generates 706 an output, which may include an anticipated or expected reward for each of multiple actions. For example, the output may include an expected reward for each of the virtual machines in the environment. The agent may perform 708 the action with the highest expected reward. The method 700 or portions thereof may then repeat for all of the agents. This allows agents to perform actions continually in a manner to use the available resources in a manner that satisfies the relevant SLAs and effectively uses the resources.

Embodiments of the invention thus provide multi-agent reinforcement learning using a single model. The framework or system may rely on a set of reinforcement agents (e.g., one per workload) that can be extended as resources are added. For example, embodiments of the invention can adapt to adding/removing virtual machines. Embodiments of the invention can be implemented as a FaaS, where all of the input can be obtained by scanning the infrastructure performing the functions. A workload is submitted and placed and/or migrated during execution.

Once the placement engine is trained, placement can be performed on the fly without additional training (although additional training is not precluded). Embodiments of the invention may place workloads that have not been seen previously. Workloads are placed at the virtual machine that provides the higher reward.

The following experiments are illustrated in the appendix, which is attached.

In one example, 8 virtual machines were available for 5 workloads. When the policy was to perform load balancing (no reinforced learning), the 5 workloads were distributed across 5 of the 8 virtual machines. When the policy was to perform minimum virtual machine placement, the workloads were all placed on the same virtual machine. This led to a minor SLA violation. When the policy was reinforcement learning, the 5 workloads were distributed to 3 of the virtual machines. This allows some power savings to be achieved (by not powering on 5 of the virtual machines as occurred during load balancing) while preventing SLA violations.

In another example, 8 virtual machines were available for 25 workloads. When the policy was to perform load balancing, the workloads were distributed across all 8 virtual machines. However, substantial placement changes occurred. When the policy was to perform minimum placement, the workloads were placed on the same virtual machine, which led to an SLA violation. When the policy was multi-agent reinforcement learning, the error was smaller than when performing minimum virtual machine placement. However, the SLA violation was prevented by adjusting the reward function.

Embodiments of the invention may help avoid changing the initial allocation or placement of a workload and thereby avoid the cost of allocation. Further, power can be conserved by reducing the active number of virtual machines, compared to a load balanced placement policy. Further, adjustments to the reward function can help prevent SLA violations during execution.

In another experiment, 20 workloads were placed on 16 virtual machines. When the policy was load balance placement, the load was distributed across all 16 virtual machines. However, many load placement changes occurred.

The following is a discussion of aspects of example operating environments for various embodiments of the invention. This discussion is not intended to limit the scope of the invention, or the applicability of the embodiments, in any way. When the policy was minimum virtual machine placement, some of the virtual machines were never used. When the policy was reinforced learning in accordance with embodiments of the invention, resources were saved (e.g., some virtual machines were not used or had less use) while the load was distributed between the virtual machines that were used.

In another experiment, 75 workloads were placed on 16 virtual machines. When the policy was load balance placement, the load was distributed across all 16 virtual machines. However, there were a lot of placement changes, which may impact the SLA requirements depending on the deployment time. When the policy was minimum virtual machine placement, the workloads could all be placed on the same virtual machine. By reducing the number of powered on virtual machines, the workloads were placed on the same virtual machine. However, this led to an SLA violation. When the policy was reinforced learning, power and/or resources were conserved while, at the same time, the workloads were distributed across a portion of the virtual machine. Thus, the reinforced learning placement approach demonstrated aspects of both load balancing and minimum virtual machine placement policies.

Embodiments of the invention advantageously reduced the number of changes of the initial allocation, since it would increase the response time when considering the time needed to deploy the workloads. Embodiments of the invention further conserved power by reducing the number of active virtual machines compared to the load balance placement policy. Further, embodiments of the invention avoided SLA violations in this example.

In general, embodiments of the invention may be implemented in connection with systems, software, and components, that individually and/or collectively implement, and/or cause the implementation of, placement operations including reward determination operations, reinforcement learning operations, workload migration operations, or the like. More generally, the scope of the invention embraces any operating environment in which the disclosed concepts may be useful.

At least some embodiments of the invention provide for the implementation of the disclosed functionality in existing backup platforms, examples of which include the Dell-EMC NetWorker and Avamar platforms and associated backup software, and storage environments such as the Dell-EMC DataDomain storage environment. In general, however, the scope of the invention is not limited to any particular data backup platform or data storage environment. The workloads may include, for example, backup operations, deduplication operations, segmenting operations, fingerprint operations, or the like or combinations thereof.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, containers, or virtual machines (VMs).

It is noted that any of the disclosed processes, operations, methods, and/or any portion of any of these, may be performed in response to, as a result of, and/or based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted. Finally, and while it is not required, the individual processes that make up the various example methods disclosed herein are, in some embodiments, performed in the specific sequence recited in those examples. In other embodiments, the individual processes that make up a disclosed method may be performed in a sequence other than the specific sequence recited.

Following are some further example embodiments of the invention. These are presented only by way of example and are not intended to limit the scope of the invention in any way.

Embodiment 1. A method comprising: receiving input into a placement engine, the input including an actual reward of a workload operating in an environment included in resources and a state, generating expected rewards including a first expected reward and a second expected reward, performing the first action on the workload, by an agent associated with the workload, when the first expected reward is higher than the second expected reward, and performing the second action on the workload when the second expected reward is higher than the first expected reward.

Embodiment 2. The method of embodiment 1, wherein the environment comprises a current virtual machine and wherein the actual reward corresponds to a service level agreement metric of the workload operating at the current virtual machine.

Embodiment 3. The method of embodiment 1 and/or 2, wherein the state incudes a one hot encoding style of all environments, each of the environments including a virtual machine.

Embodiment 4. The method of embodiment 1, 2, and/or 3, wherein the one hot encoding style includes a resource usage per virtual machine, a resource usage per workload, a state of each workload, and a time to completion for each workload using floating point values.

Embodiment 5. The method of embodiment 1, 2, 3, and/or 4, wherein the first action is to keep the workload at the current virtual machine and wherein the second action is to migrate the workload to a different virtual machine.

Embodiment 6. The method of embodiment 1, 2, 3, 4, and/or 5, wherein the placement engine comprises a neural network configured to map the input to expected rewards.

Embodiment 7. The method of embodiment 1, 2, 3, 4, 5, and/or 6, wherein the placement engine outputs an expected reward for performing an action relative to each of the virtual machine in the resources.

Embodiment 8. The method of embodiment 1, 2, 3, 4, 5, 6, and/or 7, further comprising adjusting a reward function when an SLA violation is detected.

Embodiment 9. The method of embodiment 1, 2, 3, 4, 5, 6, 7, and/or 8, wherein the reward function is:

$$f(\Delta, \sigma_L, \sigma_R) = \frac{-(\Delta)^2}{e^{2\sigma_L^2}} \text{ if } \Delta > 1, \text{ otherwise } \frac{-(\Delta)^2}{e^{2\sigma_L^2} - 1},$$

wherein $\Delta$ is a difference between an SLA response time metric and an actual response time for the workload in the environment, wherein $\sigma_L$ and $\sigma_R$ define, respectively, how fast a left and a right portion of the reward function decay.

Embodiment 10. The method of embodiment 1, 2, 3, 4, 5, 6, 7, 8, and/or 9, wherein the placement engine is trained by randomly migrating workloads amongst virtual machines in the resources.

Embodiment 11. The method of embodiment 1, 2, 3, 4, 5, 6, 7, 8, 9, and/or 10, wherein the placement engine is configured to place the workload in a manner that includes both minimum virtual machine placement and load balancing.

Embodiment 12. A method for performing any of the operations, methods, or processes, or any portion of any of these, or any combination thereof disclosed herein.

Embodiment 13. A non-transitory storage medium having stored therein instructions that are executable by one or more hardware processors to perform operations comprising the operations of any one or more of embodiments 1-12.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general-purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module', 'component', 'engine', or 'agent' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 8:
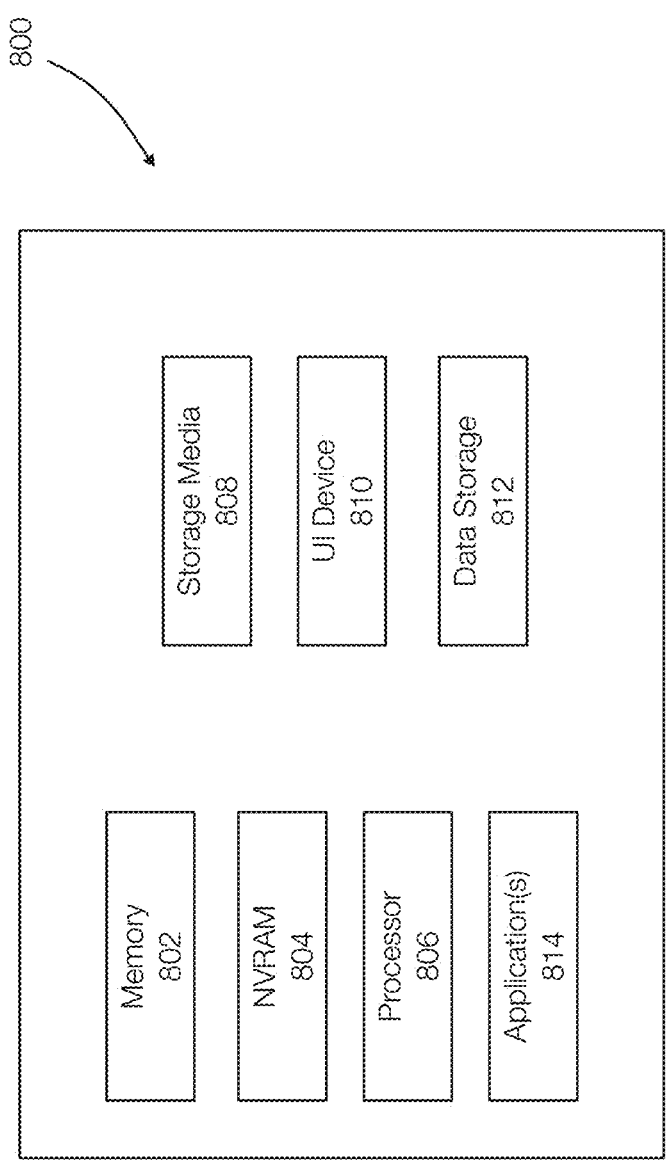
FIG. 8 discloses aspects of a computing device, system, or entity.

With reference briefly now to FIG. 8, any one or more of the entities disclosed, or implied, by the Figures and/or elsewhere herein, may take the form of, or include, or be implemented on, or hosted by, a physical computing device, a container, and/or a virtual machine, one example of which is denoted at 800. As well, where any of the aforementioned elements comprise or consist of a virtual machine (VM) or a container, that VM or container may constitute a virtualization of any combination of the physical components disclosed in FIG. 8.

In the example of FIG. 8, the physical computing device 800 includes a memory 802 which may include one, some, or all, of random access memory (RAM), non-volatile memory (NVM) 804 such as NVRAM for example, read-only memory (ROM), and persistent memory, one or more hardware processors 806, non-transitory storage media 808, UI device 810, and data storage 812. One or more of the memory components 802 of the physical computing device 800 may take the form of solid-state device (SSD) storage. As well, one or more applications 814 may be provided that comprise instructions executable by one or more hardware processors 806 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:

receiving input into a placement engine implemented on a cloud infrastructure, the input including an actual reward of a workload operating on a first virtual machine and a state, wherein the actual reward corresponds to a service level agreement (SLA) response time metric for the workload on the first virtual machine, and the state comprises a one-hot encoding vector representing, for each of a plurality of virtual machines and workloads executing thereon, resource usage, workload state, and time-to-completion values using floating-point entries;

inputting the state and actual reward into a trained neural network configured to map the input to expected rewards;

generating, by the trained neural network, the expected rewards for a plurality of candidate actions, including a first expected reward associated with maintaining the workload on the first virtual machine and a second expected reward associated with migrating the workloads to a second virtual machine; and performing, by an agent associated with the workload, a first action when the first expected reward exceeds the second expected reward, or a second action when the second expected reward exceeds the first expected reward, wherein the trained neural network is trained using a process that includes:

random migration of workloads among the plurality of virtual machines during training to explore workload placement conditions; and use of a reward function having a curve that is asymmetric and nonlinear, defined by a difference between an SLA response-time metric and an actual response time for the workload, wherein a portion of the reward curve corresponding to SLA violations decays faster than a portion corresponding to SLA compliance, such that the training of the placement engine is biased toward maintaining SLA targets in workload placement decisions.

2. The method of claim 1, wherein the cloud infrastructure comprises the plurality of virtual machines, and wherein the actual reward corresponds to a service level agreement metric of the workload operating on the first virtual machine.

3. The method of claim 2, wherein the state includes a one hot encoding style of the plurality of virtual machines.

4. The method of claim 3, wherein the one hot encoding style includes a resource usage per virtual machine, a resource usage per workload, a state of each workload, and a time to completion for each workload using floating point values.

5. The method of claim 2, wherein the first action is to keep the workload at the first virtual machine and wherein the second action is to migrate the workload to the second virtual machine.

6. The method of claim 1, wherein the placement engine comprises a neural network configured to map the input to the expected rewards.

7. The method of claim 1, wherein the placement engine outputs an expected reward for performing an action relative to each virtual machine in the cloud infrastructure.

8. The method of claim 1, further comprising adjusting the reward function when an SLA violation is detected.

9. The method of claim 8, wherein the reward function is:

$$f(\Delta, \sigma_L, \sigma_R) = \frac{-(\Delta)^2}{e^{2\sigma_L^2}} \text{ if } \Delta > 1, \text{ otherwise } \frac{-(\Delta)^2}{e^{2\sigma_L^2} - 1},$$

wherein $\Delta$ is a difference between an SLA response time metric and an actual response time for the workload in the environment, wherein $\sigma_L$ and $\sigma_R$ define, respectively, how fast a left and a right portion of the reward function decay.

10. The method of claim 1, wherein the placement engine is trained by randomly migrating workloads amongst virtual machines in the cloud infrastructure.

11. The method of claim 1, wherein the placement engine is configured to place the workload in a manner that includes both minimum virtual machine placement usage and balancing the workload across the plurality of virtual machines.

12. A non-transitory storage medium having stored therein instructions that are executable by one or more hardware processors to perform operations comprising:

receiving input into a placement engine implemented on a cloud infrastructure, the input including an actual reward of a workload operating on a first virtual machine and a state, wherein the actual reward corresponds to a service level agreement (SLA) response time metric for the workload on the first virtual machine, and the state comprises a one-hot encoding vector representing, for each of a plurality of virtual machines and workloads executing thereon, resource usage, workload state, and time-to-completion values using floating-point entries;

inputting the state and actual reward into a trained neural network configured to map the input to expected rewards;

generating, by the trained neural network, the expected rewards for a plurality of candidate actions, including a first expected reward associated with maintaining the workload on the first virtual machine and a second expected reward associated with migrating the workloads to a second virtual machine; and performing, by an agent associated with the workload, a first action when the first expected reward exceeds the second expected reward, or a second action when the second expected reward exceeds the first expected reward, wherein the trained neural network is trained using a process that includes:

random migration of workloads among the plurality of virtual machines during training to explore workload placement conditions; and use of a reward function having a curve that is asymmetric and nonlinear, defined by a difference between an SLA response-time metric and an actual response time for the workload, wherein a portion of the reward curve corresponding to SLA violations decays faster than a portion corresponding to SLA compliance, such that the training of the placement engine is biased toward maintaining SLA targets in workload placement decisions.

13. The non-transitory storage medium of claim 12, wherein the cloud infrastructure comprises the plurality of virtual machines and wherein the actual reward corresponds to a service level agreement metric of the workload operating on the first virtual machine.

14. The non-transitory storage medium of claim 13, wherein the state includes a one hot encoding style of the plurality of virtual machines.

15. The non-transitory storage medium of claim 14, wherein the one hot encoding style includes a resource usage per virtual machine, a resource usage per workload, a state of each workload, and a time to completion for each workload using floating point values.

16. The non-transitory storage medium of claim 13, wherein the first action is to keep the workload at the first virtual machine and wherein the second action is to migrate the workload to the second virtual machine.

17. The non-transitory storage medium of claim 12, wherein the placement engine comprises a neural network configured to map the input to the expected rewards, wherein the placement engine is configured to place the workload in a manner that includes both minimizing virtual machine usage and balancing the workload across the plurality of virtual machines.

18. The non-transitory storage medium of claim 12, wherein the placement engine outputs an expected reward for performing an action relative to each virtual machine in the cloud infrastructure.

19. The non-transitory storage medium of claim 12, further comprising adjusting a reward function when an SLA violation is detected.

20. The non-transitory storage medium of claim 19, wherein the reward function is:

$$f(\Delta, \sigma_L, \sigma_R) = \frac{-(\Delta)^2}{e^{2\sigma_L^2}} \text{ if } \Delta > 1, \text{ otherwise } \frac{-(\Delta)^2}{e^{2\sigma_L^2} - 1},$$

wherein $\Delta$ is a difference between an SLA response time metric and an actual response time for the workload in the environment, wherein $\sigma_L$ and $\sigma_R$ define, respectively, how fast a left and a right portion of the reward function decay.

* * * * *